April 6, 1948.  E. WEBER ET AL  2,439,193
SMALL MOTOR, PARTICULARLY SYNCHRONOUS FRACTIONAL HORSE-POWER MOTOR
Filed July 4, 1942
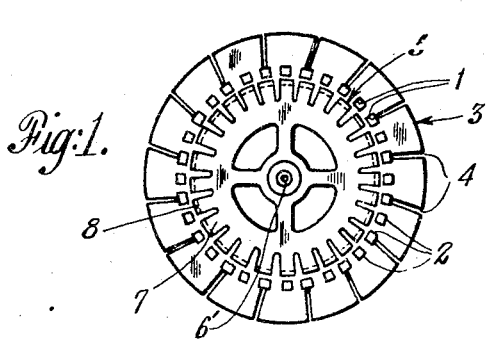
Fig:1.
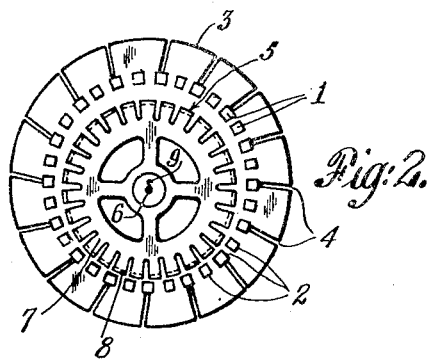
Fig:2.
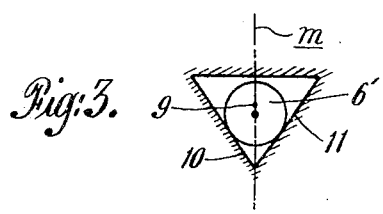
Fig:3.
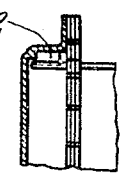
Fig:4.
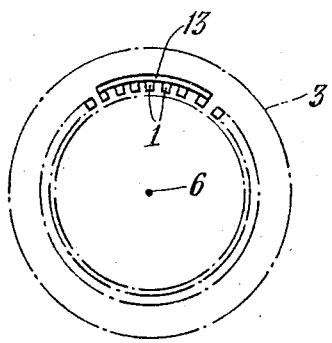
Fig:5.
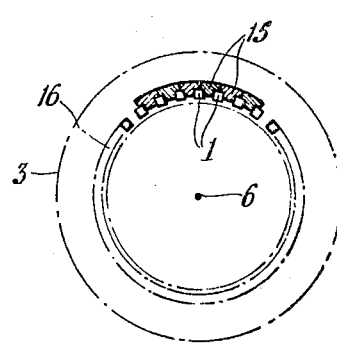
Fig:6.
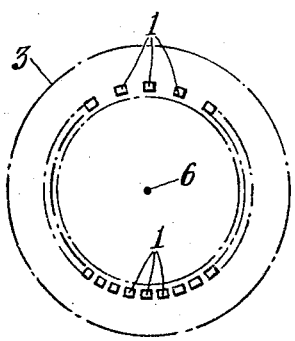
Fig:7.
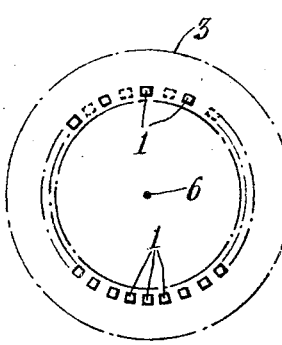
Fig:8.
Inventors:—
Ernst Weber, Richard Pudelko
Carl Bollman and Henri Vermeulle
by Hobart N Durham, Attorney Patented Apr. 6, 1948

2,439,193

UNITED STATES PATENT OFFICE 2,439,193

SMALL MOTOR, PARTICULARLY SYNCHRONOUS FRACTIONAL HORSEPOWER MOTOR

Ernst Weber, Uster, Richard Pudelko, Zug, Carl Bollmann, Zurich-Albisrieden, and Henri Wermeille, Zug, Switzerland, assignors to Landis & Gyr, A. G., Zug, Switzerland, a corporation of Switzerland Application July 4, 1942, Serial No. 449,794
In Switzerland July 14, 1941

5 Claims. (Cl. 172—36)

The present invention relates to small motors, particularly synchronous fractional horsepower motors such as are utilized for clocks, tariff apparatus, time switches, recording apparatus, frequency indicators, in remote apparatus and equipment and the like.

Small contrivances of the above kind, which are manufactured in mass production and consequently with no exacting precision, exhibit forces of varying kinds, magnitude and directions affecting the rotor. Because of this the rotor is drawn to and fro transversely to its axis due to its slight weight, thus striking (knocking) in the bearing. Said forces are partly produced by magnetic unsymmetries in the stator and rotor, e. g., irregular rotary field, out of round, and the like, and partly by bearing friction. As the rotor must have some play, it moves, owing to friction, upward the bush wall till the angle of tangency on the contact part of the rotor shaft with the bearing surface is equal to the angle of friction, whereupon the shaft again drops and strikes below. As such small contrivances have to run for a long time without attendance, i. e., practically without oil in their bearings, they become generally noisy.

It is a primary object of the invention to overcome the above mentioned inconveniences without prejudice to the good running properties of the motor by providing an auxiliary force interfering with the noise-producing forces of various kinds, magnitude and direction permanently in the same predetermined direction and acting transversely to the axis of the rotor, thus outweighing the noise-producing force in their totality and rendering them ineffective.

This auxiliary force consists in magnetic attraction or pull which acts in the direction of gravity. The directed magnetic attraction may be produced either by providing a differently limited air gap between the one or the other half of the stator-rotor, e. g. preferably by eccentric bearing arrangement of the rotor shaft with respect of the stator axis, or else the magnetic pull may be obtained by producing determined magnetic unsymmetries of the pole fluxes by having these smaller in a certain part of the stator circumference than in the opposite part.

The annexed drawing and the description set forth in detail certain preferred structures embodying the invention, such disclosed means constituting, however, but some of various other structural forms in which the principle of the invention may be used.

In said annexed drawings:

Fig. 1 shows a front view of a small synchronous motor.

Fig. 2 shows the eccentric arrangement of the rotor.

Fig. 3 illustrates certain preferred bearing in cross-section on an enlarged scale.

Figs. 4 to 6 are various embodiments of stator pole bridgings, while

Figs. 7 and 8 represent varied arrangements and designs of the stator pole.

Referring more particularly to the drawings—

Fig. 1 shows the split-poles 1 of the magnetic system of the motor, which protrude from openings 2 of a short-circuit disc 3, each alternate opening 2 of it being interrupted by a slit 4 by which, in the phase, split fluxes are generated, thus constituting the rotary field. The rotor 5 comprises a steel plate 7 attached to the shaft 6' and, at right angles to it, bent flaps 8 which form the poles.

According to Fig. 2 the arrangement for obtaining the directed magnetic auxiliary force is so provided that the suitably varied air gap adjustment for this purpose between the one and the other stator or rotor half is ensured by eccentric mounting of the rotor shaft axis 6 with respect to the stator axis 9. Due to the downward vertical displacement of the shaft 6' the air gap in the upper half becomes greater than on the lower, so that the magnetic pull ensues likewise vertically downwards being thus supported by the weight of the rotor. The eccentricity between the rotor shaft axis and the stator axis is between 0.03 mm. and 0.1 mm. for the said purpose of minimizing, avoiding or eliminating noises.

For the bearing of the rotor shaft 6' the shape shown in Fig. 3 is preferably employed, said bearing being of triangular cross-section. The shaft 6' rests on two lateral surfaces 10 and 11 whereby a practically playless V-bearing is formed below the horizontal plane through the axis of shaft 6'. The distance of the top surface from the shaft corresponds to the normal bearing play. In respect of the stator axis 9 the bearing is displaced by the corresponding eccentricity.

Instead of the triangular bearing hole with two bearing surfaces a sector-shaped or otherwise untrue bearing may be employed equally well. The chief point in this design is that the shaft is borne on two sides of two downwardly converging surfaces, thus forming an angle. The size of the angle enclosed by the bearing surfaces depends entirely on the requirements, i. e., the friction coefficients of the respective bearing material; the greater this angle can be the more favourable are the bearing conditions. An angle of 90° may be taken as the usual one, while the (boundary) limit would practically be 60°. The bisecting line $m$ of the angle enclosed by the surfaces 10 and 11 corresponds suitably with the direction of gravity, so that a symmetry is obtained both in the arrangement and the distribution of forces tending to a further avoidance of noise.

The magnetic attractive force unidirectional with gravity in connection with the eccentricity of the rotor shaft provided in the same direction ensures in general the most favourable effect, because, on the one hand, the desired magnetic auxiliary force is obtained in the form of a pull supported by the rotor weight owing to the vertical eccentric arrangement of the rotor shaft in respect of the stator axis, while on the other hand the positioning of the rotor shaft on two parts of an angle bearing prevents the shaft from going up and down, i. e., striking, caused by the mechanical power of bearing friction.

The bearing may consist of any suitable material, preferably oil-impregnated hard fabric.

The magnetic pull as well as the eccentricity of the bearing can of course be adjusted to any other direction desired. Usually, however, the attractive force and eccentricity direction corresponding with the direction of gravity is to be preferred.

The magnetic auxiliary force must always be greater than the totality of the forces which cause noise. It is smallest when running in the direction of gravity, being in this case supported by the rotor weight.

Instead of the eccentric arrangement of the rotor shaft with respect to the stator axis a diversity of air space and with it the magnetic auxiliary force can be obtained by adjusting the stator poles themselves with respect to the stator axis and the rotor poles respectively. This can be done either by the factory at the outset or subsequently by suitably bending the stator poles.

It is understood that the magnetic auxiliary force can likewise be obtained otherwise than by air gap variations, viz., by a magnetic unsymmetry intended for weakening or strengthening the pole fluxes at parts of the stator circumference and weakening or strengthening them in the opposite stator parts.

The magnetic unsymmetry provided for obtaining the auxiliary force may be produced by short-circuiting at least two adjacent unlike poles by a magnetic bridge at that part of the stator circumference corresponding to the pull direction of the auxiliary force. This bridge may either consist of iron plates 12 (according to Fig. 4) to be put in between the poles, or curved plates 13 extending over several pole lengths secured at both ends, for instance by rivets to corresponding poles. (See Fig. 5.)

Fig. 6 shows an example, in which the magnetic bridge is represented by iron plates 15 which are attached (or set in) to the inner surface of the motor envelope 16 in such a way that when this is placed on the motor the iron plates adjust themselves between the poles of the stator thus forming the bridge.

Further, as shown in Fig. 7, single stator poles may be left away or removed from one part. The magnetic auxiliary force can also be brought about by uneven distribution of the stator poles in such a way, that for instance fewer poles are distributed above the upper half than above the lower one (Fig. 8). In the same way stator poles may be employed, one half of which is smaller than the other.

In each of the embodiments according to Figs. 4 to 8 a more favourable magnetic condition is created in that part of the stator-rotor circumference determining the radial direction of the auxiliary force than in the part opposite.

The disclosed arrangements of the magnetic auxiliary force in connection with the special eccentric bearings enable noises to be prevented without any ascertainable unfavourable effect on the running properties of the motor.

According to the invention the special bearing can be provided for both journals of the motor. In most cases it will suffice to provide it at that part turned towards the rotor.

It will be understood that the embodiments hereinbefore described have been given only by way of example and that the details thereof may be modified without departing beyond the scope of the invention and set forth in the appended claims.

What we claim is:

1. A fractional horsepower induction motor having a stator producing a rotating field, a rotor to be driven by said field, and bearing means for the rotor in contact therewith below the horizontal plane through the axis thereof, said axis being spaced a small distance from and directly below the axis of the stator field whereby the field acts more strongly on the rotor in the direction of gravity to draw it down and hold it normally in engagement with said bearing means.

2. A fractional horsepower induction motor according to claim 1 in which the stator comprises an annular series of pole pieces uniformly spaced.

3. A fractional horsepower induction motor according to claim 1, said stator comprising an annular series of pole pieces and said rotor bearing having downwardly converging side walls.

4. A fractional horsepower induction motor according to claim 1, said stator comprising an annular series of pole pieces and said rotor bearing having downwardly converging side walls the inclination of said walls equalling the angle of friction.

5. A fractional horsepower induction motor according to claim 1, said stator comprising an annular series of pole pieces and said rotor bearing having downwardly converging side walls the inclination of said walls equalling the angle of friction, and said bearing having an upper portion normally spaced from the shaft of the rotor to allow it to have upward movement and forming a stop to limit such movement.

ERNST WEBER.
RICHARD PUDELKO.
CARL BOLLMANN.
HENRI WERMEILLE.

REFERENCES CITED

The following references are of record in the file of this patent:

UNITED STATES PATENTS

| Number | Name | Date |
|---|---|---|
| 2,180,853 | Scheppmann | Nov. 21, 1939 |
| 2,073,526 | Pestarini | Mar. 9, 1937 |

FOREIGN PATENTS

| Number | Country | Date |
|---|---|---|
| 97,952 | Switzerland | Feb. 16, 1923 |
| 317,841 | Germany | Dec. 31, 1919 |